C. T. HENDERSON.
MOTOR CONTROLLER.
APPLICATION FILED JUNE 29, 1914.

1,339,930.

Patented May 11, 1920.
3 SHEETS—SHEET 2.

Witnesses
J. L. Johnson
H. Walker

Inventor
Clark T. Henderson
By Frank W. Hubbard
Attorney

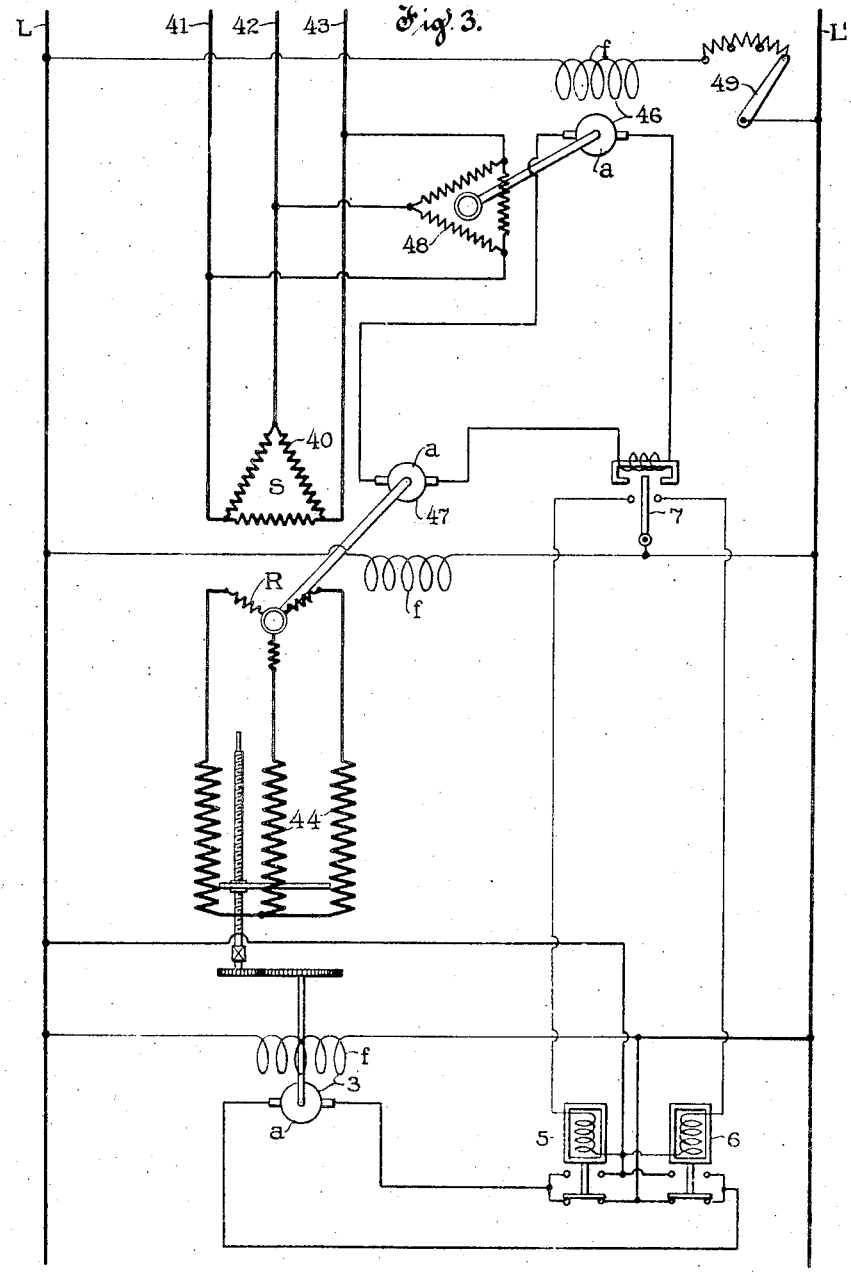

UNITED STATES PATENT OFFICE.

CLARK TRAVIS HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,339,930.     Specification of Letters Patent.     Patented May 11, 1920.

Application filed June 29, 1914. Serial No. 847,974.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to improvements in motor controllers.

The invention has among its objects to provide a controller for electric motors operating under varying loads, which will automatically tend to maintain the controlled motor at a given speed notwithstanding variations in its load.

Other objects and advantages of the invention will hereinafter appear.

In the accompanying drawings several embodiments of the invention have been diagrammatically illustrated and the same will now be described.

Fig. 3 shows a controller applied to an A. C. motor.

Figure 1:
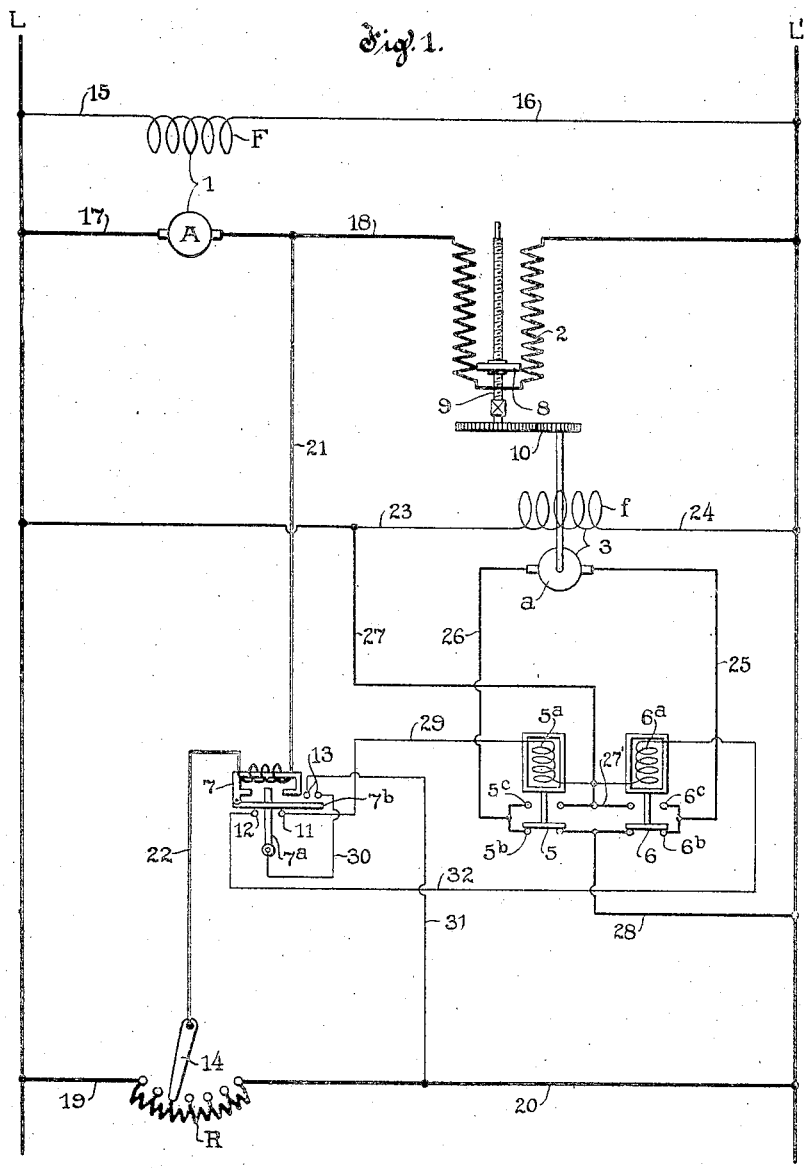
Figure 1 shows a controller applied to a D. C. motor.

Referring first to Fig. 1 the same shows a main controlled motor 1 governed by a rheostat 2 operated by a reversible pilot motor 3. The pilot motor 3 is governed by electromagnetic reversing switches 5 and 6 responsive to reverse operation of a polarized relay 7. The relay 7, as will hereinafter appear, is connected in a Wheatstone bridge, including the armature of motor 1, and is adapted to operate upon variations in speed of said motor and in a direction corresponding to the character of such speed variations. Operation of the relay in turn causes a corresponding operation of the rheostat 2 to rectify the speed variations of the motor 1.

The motor 1 is shown as of the shunt type, being provided with an armature A and a shunt field winding F. The rheostat 2 is in series with the armature A and varies the speed of the motor by increasing or decreasing the resistance in the armature circuit. As will be understood, operation of the rheostat to increase the resistance in the armature circuit slows down the motor, while reverse operation of the rheostat to decrease the resistance accelerates the motor. Under normal speed conditions the rheostat stands in an intermediate position whereby it may be operated to rectify either positive or negative speed variations.

The rheostat is schematically illustrated as of the cross head type, having a traveling resistance varying element 8 operated by a screw shaft 9 driven by the pilot motor 3. The pilot motor 3 is shown as of the shunt type, being provided with an armature $a$ and a shunt field winding $f$, said motor having its armature operatively connected to the screw shaft 9 through suitable gearing 10.

The reversing switches 5 and 6 are provided with operating windings $5^a$ and $6^a$ respectively and each has two operative positions. When deënergized the switches 5 and 6 bridge down contacts $5^b$ and $6^b$ respectively and when energized bridge up contacts $5^c$ and $6^c$ respectively. As will hereinafter appear, the switches 5 and 6 are energized selectively to start the pilot motor in opposite directions and when both switches are deënergized the same establish a dynamic braking circuit across the terminals of the pilot motor armature.

The polarized relay 7 has an armature $7^a$ to be attracted in opposite directions in accordance with the polarization of said relay. This armature coöperates with contacts 11 and 12 to act as a selector for the reversing switches 5 and 6. The relay also has a second armature $7^b$ which is attracted in the same manner when the relay is energized irrespective of its polarization. This armature coacts with contacts 13 to complete the energizing circuit of the switch selected by the armature $7^a$. Thus, both armatures must be attracted to complete circuit for either of the reversing switches, the armature $7^a$ acting only as a selector and the armature $7^b$ acting to make and break circuit. The armature $7^b$ may be set to respond and drop out at any predetermined current values to determine the duration of energization of the reversing switches, while the armature $7^a$, need only be actuated upon reversal of the polarity of the relay.

To provide the aforesaid Wheatstone bridge connections the armature of the main motor 1 and its rheostat 2 are paralleled by a suitable resistance R and the winding of relay 7 is connected on one side to a point between the armature A and rheostat 2 and on its other side to an adjustable tap 14 of the resistance R.

Thus if the main motor 1 be adjusted by the rheostat 2 or other means, to operate at the desired speed under normal load and the connection between the relay winding and resistance R be adjusted to balance the bridge, the relay 7 will be inert and will render the rheostat 2 quiescent. Should, however, the speed of the motor 1 vary the Wheatstone bridge would become unbalanced, effecting energization of the relay 7 with a polarization corresponding to the character of the speed variation. This in turn would effect operation of the rheostat 2 in a direction to rectify the speed variation and upon accomplishment of this the relay would again become inert thereby rendering the rheostat quiescent.

The circuit connections will now be more specifically described: The field of main motor 1 is connected by conductors 15 and 16 to supply lines L, L' respectively. The armature of motor 1 is connected by conductor 17 to line L, and by conductor 18 through rheostat 2 to line L'. The resistance R is connected by conductor 19 to line L and by conductor 20 to line L'. The winding of relay 7 is connected by conductor 21 to conductor 18 and by conductor 22 to the adjustable tap 14 of resistance R.

The field $f$ of the pilot motor is connected by conductor 23 to line L and by conductor 24 to line L'. The armature of the pilot motor is normally connected in a closed loop extending from the right hand terminal thereof by conductor 25 through the down contacts $6^b$ and $5^b$ of switches 6 and 5 by conductor 26 to the left hand terminal of the motor armature. Thus whenever the armature of the pilot motor is disconnected from the supply circuit said motor will act as a dynamic brake and quickly come to rest. Upon response of switch 5 the armature circuit of the pilot motor is closed from conductor 23 by conductor 27 to conductor $27'$ through the up contacts $5^c$ of switch 5, by conductor 26 through the armature $a$ from left to right, by conductor 25 through the down contacts $6^b$ of switch 6, by conductor 28 to line L'. Upon response of switch 6 the circuit of the motor armature is closed from conductor 27 by conductor $27'$ through the up contacts $6^c$ of switch 6, by conductor 25 through the armature $a$ from right to left, by conductor 26 through the down contacts $5^b$ of switch 5, by conductor 28 to line L'.

With the armature $7^a$ of the polarized relay in engagement with contact 11 and with the armature $7^b$ in engagement with contacts 13, circuit is closed from conductor 27 through the winding $5^a$ of switch 5, by conductor 29 through the armature $7^a$ by conductor 30 through the armature $7^b$, by conductors 31 and 20 to line L'. On the other hand, when the armature $7^a$ engages contact 12 circuit is completed from conductor 27 through the winding $6^a$ of switch 6, by conductor 32 through armature $7^a$ to line L', as already traced.

Figure 2:
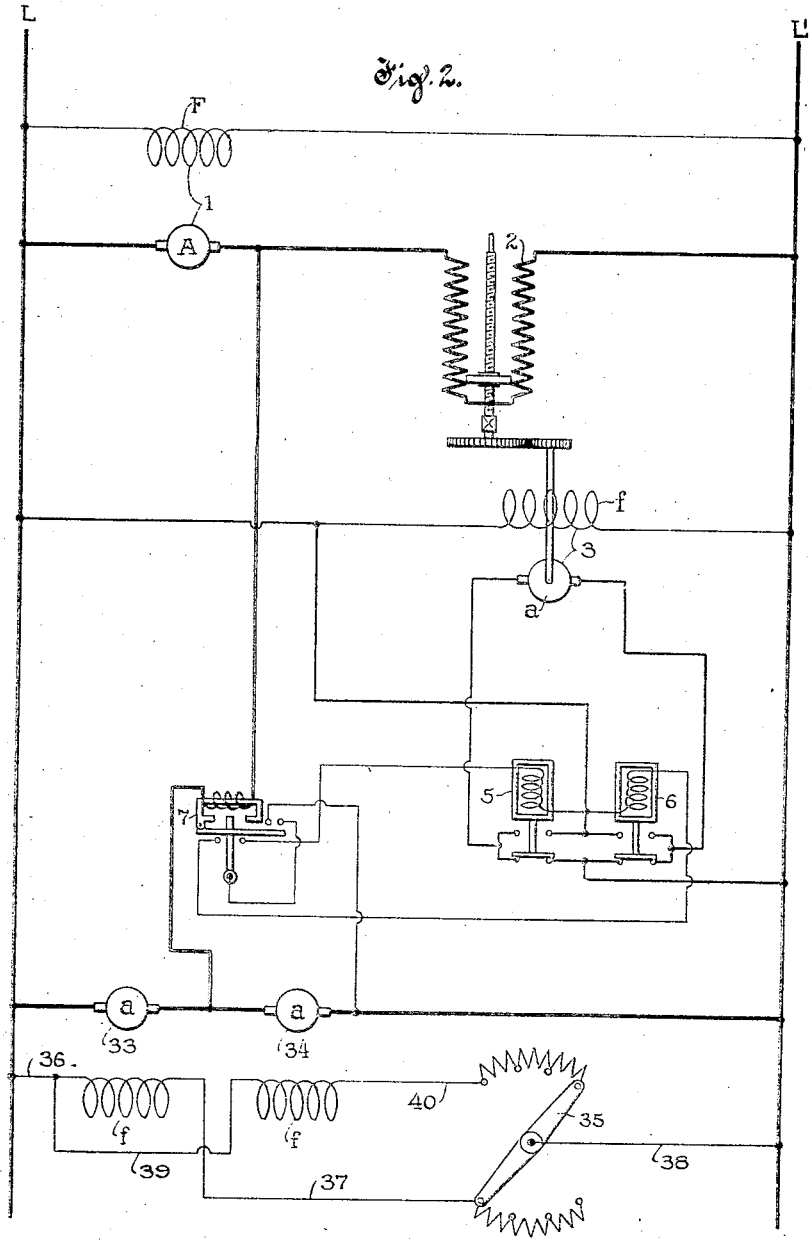
Fig. 2 shows a modified form of controller also applied to a D. C. motor.

Referring to the controller shown in Fig. 2, the same is precisely like that shown in Fig. 1 except in the Wheatstone bridge formation. In this instance two motors 33 and 34 are provided in lieu of the resistance R. Both of these motors are of the shunt type, each being provided with an armature $a$ and a shunt field winding $f$. The armatures are connected in series across the lines L, L' and form with the main motor armature A, rheostat 2 and relay 7 a Wheatstone bridge, said relay being connected at a point between the armatures $a$. The field windings of the two motors are connected across the lines L, L' through a rheostat 35 and are thus adjustable to enable regulation of the C. E. M. F. of the two motors to balance the Wheatstone bridge under normal speed conditions. As will be understood, the motors 33 and 34 after adjustment thereof operate at constant speed whereby the Wheatstone bridge will become unbalanced upon variations in the speed of the main motor with consequent response of the relay 7 and motor operated rheostat 2 as hereinbefore set forth.

The circuit of the field winding of motor 3 extends from line L by conductor 36 through said winding, by conductor 37 to one side of the rheostat 35, by conductor 38 to line L'. The circuit of the field winding of motor 34 extends from conductor 36 by conductor 39 through said winding, by conductor 40 to the other side of the rheostat 35 and thence by conductor 38 to line L'. The rheostat 35, as will be observed, acts oppositely on the two field windings; that is, cutting out resistance in circuit with one upon inserting resistance in circuit with the other, whereby the desired regulation may be readily obtained.

Referring now to Fig. 3 the same shows a three-phase alternating current motor 40 having a stator S and a rotor R. The stator of the motor is supplied with current from a three-phase alternating current circuit 41, 42 and 43, while the rotor is connected to a rheostat 44 similar to that shown in Figs. 1 and 2 but modified for the A. C. motor.

The rheostat 44, as in the former instances, is operated by a D. C. pilot motor 3 supplied with current from lines L and L' and governed by reversing switches 5 and 6 and a polarized relay 7 similar to those already described.

The winding of the polarized relay 7 in this instance is connected in circuit with two opposing or bucking generators 46 and 47. Both generators are provided with field windings $f$ supplied with current from the D. C. supply circuit L, L' and the armature $a$ of generator 47 is driven from the rotor of the main motor 40 while the armature $a$ of generator 46 is driven by a constant speed alternating current motor 48 operating upon power from the alternating current source.

The arrangement is such that at normal speed of the main motor 40 the output of the generator 46 equals that of the generator 47 thus rendering the polarized relay inert. On the other hand, any variation in the speed of the motor causes the output of the generator 47 to either exceed or fall below that of the generator 46 thereby energizing relay 7 and adjusting its polarity according to which generator predominates. Thus this arrangement effects substantially the same results as the Wheatstone bridge arrangement heretofore described.

As illustrated the output of the generator 46 may be balanced with respect to that of the generator 47 at normal speed of the main motor by a rheostat 49 in series with the field winding $f$ of said generator 46. As will be understood, as the resistance in the field circuit of the generator 46 is increased its output is decreased, and conversely, when the resistance is decreased, its output is increased.

What I claim as new and desire to secure by Letters Patent is:—

1. The combination with a motor operating under varying loads, of electro-responsive speed regulating means having a plurality of circuits for control thereof to selectively increase or decrease the speed of said motor, a relay having a winding and two armatures, one of said armatures being polarized and movable in opposite directions under reverse current conditions in said winding and the other being attracted and released at predetermined values of such current, said former armature in its attracted positions coöperating with said latter armature in its attracted position to close the circuits of said speed regulating means selectively but subject to interruption upon release of said latter armature and means whereby said relay is energized upon variations in the speed of said main motor from a given value and whereby the direction of current through said relay is varied in accordance with the character of speed variation.

2. The combination with a motor operating under varying loads, of a variable resistance for controlling said motor, a reversible pilot motor for regulating said resistance, a pair of reversing switches for controlling said pilot motor and for establishing dynamic braking connections therefor, a relay having a winding and two armatures, one of said armatures being polarized and movable in opposite directions under reverse current conditions in said winding and the other being attracted and released at predetermined values of such current, said former armature in its attracted positions coöperating with said latter armature in its attracted position to energize said reversing switches selectively but subject to interruption upon release of said latter armature, and means whereby said relay is energized upon variations in speed of said main motor from a given value and whereby the direction of current through said relay is varied in accordance with the character of speed variation In witness whereof I have hereunto subscribed my name in the presence of two witnesses.

CLARK TRAVIS HENDERSON.

Witnesses:
 TEKLA BAST,
 L. A. WATSON.